United States Patent [19]

Yanagihara et al.

[11] Patent Number: 5,322,745
[45] Date of Patent: Jun. 21, 1994

[54] STORAGE BATTERY SYSTEM

[75] Inventors: Nobuyuki Yanagihara; Eiji Kadouchi, both of Hirakata; Munehisa Ikoma, Nara; Isao Matsumoto, Osaka, all of Japan

[73] Assignee: Matsushita Electric Industrial Co., Ltd., Osaka, Japan

[21] Appl. No.: 143,635

[22] Filed: Nov. 1, 1993

[30] Foreign Application Priority Data

Nov. 10, 1992 [JP] Japan ................... 4-299516

[51] Int. Cl.$^5$ ............................................. H01M 10/36
[52] U.S. Cl. ..................................... 429/59; 429/101; 429/148; 429/159
[58] Field of Search ............... 429/59, 57, 101, 120, 429/148, 151, 159, 27, 149, 163

[56] References Cited

U.S. PATENT DOCUMENTS

| | | | |
|---|---|---|---|
| 3,320,095 | 5/1967 | Bingeman et al. | 429/151 |
| 3,338,452 | 8/1967 | Oakley et al. | 429/151 X |
| 3,623,917 | 11/1971 | Chassoux | 429/148 X |
| 4,020,244 | 4/1977 | Selinko | 429/159 X |
| 4,347,294 | 8/1982 | Mejia | 429/159 X |
| 4,517,263 | 5/1985 | Reiss et al. | 429/120 |
| 4,621,034 | 11/1986 | Kanda et al. | 429/59 |
| 4,925,748 | 5/1990 | Jkoma et al. | 429/101 X |

FOREIGN PATENT DOCUMENTS 3291867 12/1991 Japan.

*Primary Examiner*—Anthony Skapars
*Attorney, Agent, or Firm*—Stevens, Davis, Miller & Mosher

[57] ABSTRACT

The dimensions of an electrode group in each battery are set so as to obtain a relationship such as $H > L > W$, where H is the height of the electrode group, L is the width thereof and W is the thickness thereof, and the product K of the width L and the thickness W, that is, $K = L \times W$, is set so as to fall in a range $10 < K < 100$ while the space D between adjacent batteries is set so as to fall in a range of $0.02 \leq D/W \leq 0.3$, thereby the efficiency of heat radiation of a battery module or a battery group is enhanced, and accordingly, the cycle life and the discharge capacity of the battery can be enhanced.

21 Claims, 9 Drawing Sheets

FIG. 1a
FIG. 1b
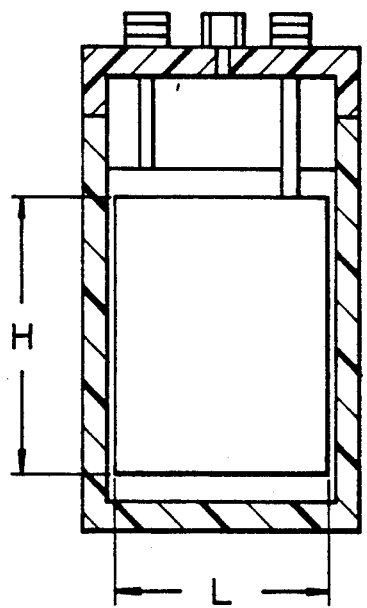
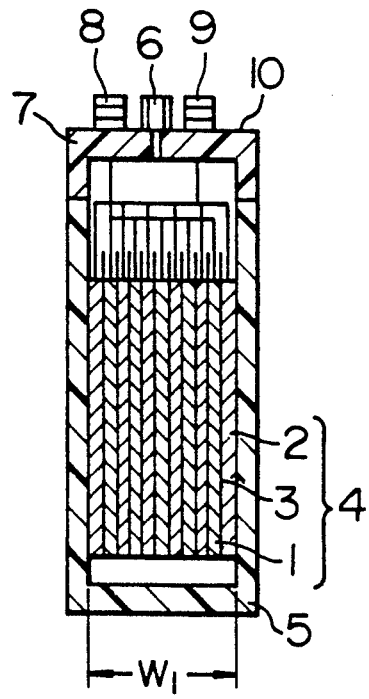

K VALUE OF ELECTRODE GROUP
(K = L x W₁)

THICKNESS OF ELECTRODE
GROUP W₁ (mm)

(A) (B)

(A) (B)

(A) (B)

ELECTROLYTE QUANTITY (ml/Ah)

STORAGE BATTERY SYSTEM

BACKGROUND OF THE INVENTION

1. Field of the Invention

The present invention relates to a storage battery system consisting of a battery module in which a plurality of storage batteries each using negative electrodes made of, as a main component, a hydrogen storage alloy that electrochemically absorbs and desorbs hydrogen, are arranged in rows, or which comprises a battery group composed of a plurality of such battery modules combined with one another and arranged in rows, and in particular to the heat radiation structure of the storage battery system.

2. Prior Art of the Invention

A nickel-hydrogen storage battery having a negative electrode which is a hydrogen storage electrode made of hydrogen storage alloy or the hydride thereof, and a positive electrode made of nickel oxide, is interchangeable with a nickel-cadmium storage battery but can have a capacity greater than that of the nickel cadmium battery. However, such a nickel-hydrogen storage battery expels a large volume of oxygen gas from its positive electrodes during charging or in particular upon overcharging.

This oxygen gas is reacted with hydrogen occluded in the negative electrode so as be reduced into water. At this time, the temperature of the battery rises due to the exothermic reaction thereof. Further, it has been known that the temperature rise at this time is higher than that of the nickel-cadmium storage battery during charging.

Further, a conventionally used small size cylindrical type nickel-hydrogen storage battery radiates its generated heat, outside of the battery during charging with a high degree of efficiency since the sheath casing is made of metal, and accordingly, the temperature rise of the battery is not high even upon overcharging.

However, a nickel-hydrogen storage battery having an intermediate capacity of about 20 to 300 Ah generates a large volume of heat during charging. The generation of heat is caused by a joule heat due to a resistance, heat of reaction due to electrode reaction and heat of reaction by hydrogen.

At this time, if the efficiency of heat radiation of the battery, outside of the battery, is not high, the generated heat is accumulated in the battery, resulting in abrupt increase in the temperature of the battery.

Further, since the charging and discharging efficiency of the battery is lowered if the temperature of the battery becomes high, and accordingly, the availability of active materials decreases. Thus, it has been found that a desired battery characteristic is sometimes unable to be obtained if the heat generated during charging is not efficiently radiated outside of the battery.

Further, in a storage battery module in which a plurality of storage batteries are stacked one upon another, or in a storage battery system composed of a battery group in which a plurality of such storage battery modules are arranged, the temperatures of the batteries differ from each other depending upon the dispositions of the batteries during charging.

Gas or electrolyte possibly leaks from a battery at a high temperature through a safety valve incorporated in the battery case since the internal pressure of the battery increases, and accordingly, the use life of the entire storage battery system is deteriorated due to the battery from which electrolyte has is been depleted.

Further, a battery module having a relatively small capacity has less charge and discharge current, and accordingly, the temperature rise of the battery is not high. However, the larger the capacity thereof, the larger the charge and discharge current, and further, since the number of batteries constituting the battery module becomes larger, the efficiency of heat radiation of the battery is lowered, thereby the temperature rise of the battery becomes higher.

The structure of the battery system in which the efficiency of heat radiation of a storage battery system having a large capacity and a large number of batteries to be used can be enhanced so as to restrain the temperature rise of the batteries is important.

In order to solve the above-mentioned problems, Japanese Laid-Open Patent No. 3-291867 proposes a storage battery system in which several batteries inevitably generating heat are arranged in rows, and in which spaces through which air flows are defined between the batteries, having the ratio between the width of the spaces between the batteries, and the width of a single battery set in a range of 0.1 to 1.0.

Further, a device for forcibly blowing air into the spaces between the batteries is attached to one side surface of the storage battery system in order to restrain the temperature rise of the batteries during charging.

However, in this arrangement, if the ratio between the width of the spaces between the batteries, and the width of the single battery is increased to 1, although it is preferable in view of the heat radiation, the bulk of the storage battery system increases since the width of the spaces becomes larger, and accordingly there has been raised a problem of lowering the energy density of the battery system (which corresponds to the ratio between the output energy and the bulk of the battery system). Further, since the width of the spaces between the batteries is regulated in accordance with the width of the batteries, that is, the width of the battery casings, the width of the spaces between the batteries varies even though the same electrode groups are used, because the width of the battery casings vary as the thickness of the walls of the battery casings varies. The temperature rise of the batteries during charging depends upon the size of the electrode group stored in the battery casing.

That is, the larger the thickness of the electrode group, the harder it is to radiate the generated heat, that is, the larger the heat is accumulated in the electrode group. Accordingly, the space between the batteries, which influences the efficiency of heat radiation of the storage battery system, should be determined not by the width of the batteries but by the thickness of the electrode group. Further, it is appropriate to regulate the width of spaces between the batteries in accordance with the thickness of the electrode group under such a condition that the thickness-wise sectional area of the electrode group falls in a certain specified range.

SUMMARY OF THE INVENTION

The present invention is devised in order to solve the above-mentioned problems, and accordingly, one object of the invention is to provide a storage battery system in which a plurality of batteries are stacked one upon another with spaces therebetween, which can efficiently radiate heat generated during charging, outside of the batteries, so as to restrain the temperature rise of the batteries during charging, and which can reduce dispersion among battery capacities so as to be excellent in the cycle life characteristic.

To that end, according to the present invention, there is provided a storage battery system comprising at least one of battery modules each comprising a plurality of batteries, each of the plurality of batteries having a battery casing and including an electrode group which is composed of positive electrodes using metal oxide as an active material, negative electrodes made of, as a main component, hydrogen storage alloy which electrochemically absorbs and desorb hydrogen, and separators, and which is disposed in the battery casing; the plurality of batteries being arranged in rows with spaces being defined between adjacent those of the plurality of batteries; the electrode group having a dimensional relationship such as $H>L>W$, where H is the height of the electrode group, L is the width of the electrode group, and W is the thickness of the electrode group; a value K which is obtained by multiplying the width L with the thickness W, that is, $K=W\times L$, falling in a range of $10 \text{ cm}^2 \leq K \leq 100 \text{ cm}^2$; and, a ratio $D/W$ between the width D of spaces between the adjacent those of said plurality of batteries, and the thickness W of the electrode group falling in a range of $0.02 \leq D/W \leq 0.3$.

In the above-mentioned arrangement according to the present invention the relationship between the width D of the spaces between the batteries and the thickness of the electrode group W is set so to be such as $0.02 \leq D/W \leq 0.3$ under a condition such that the thicknesswise sectional area of the electrode group, that is, the product K of the width L and the thickness W of the electrode group, falls in the range of $10 \text{ cm}^2 \leq K \leq 100 \text{ cm}^2$. The heat generated during charging of a battery depends upon the size of the electrode group therein, and is radiated in proportion to the sectional area (the height $H \times$ the width L) of the electrode group. From this fact, the value of heat accumulated in the battery depends on the thicknesswise sectional area (the width $L \times$ the thickness W) of the electrode group. Thus, by appropriately selecting the width D of the spaces between batteries with respect to the thickness of the electrode group which can satisfy the above-mentioned relational expressions, heat generated upon overcharging can be efficiently radiated outside of the batteries without being accumulated inside of the batteries.

Further, in a case such that a pair of electrode groups are disposed in a two cell battery casing, or in the case of a battery module in which pairs of batteries are arranged in rows with spaces therebetween, each pair of batteries being connected together, the following measures can be taken:

Since each pair of batteries are joined together with no space therebetween, the ratio between the space D between the pairs of batteries and the thickness W of the electrode group are set so as to fall in a range of $0.04 \leq D/W \leq 0.6$ which is twice as large as that of the case of batteries themselves arranged in rows, thereby it is possible to efficiently radiate the heat generated in the pairs of batteries.

Further, in the case of the battery group in which a plurality of the above-mentioned battery modules are arranged in row with spaces therebetween, the ratio between the width $D_3$ of the spaces between the batteries modules and the thickness W of the electrode group is set so as to fall in a range of $0.05 \leq D_3/W \leq 2$, thereby it is possible to efficiently radiate the heat generated in the battery group.

Further, the above-mentioned storage battery system incorporates an air supply device which forcibly feeds cooling air into the spaces defined between the batteries from one side of the storage battery system, and which may suck up cooling air from the other side thereof as the case may be.

With this arrangement in which air is forced to flow through the spaces between the batteries in the storage battery system, the air can flow uniformly among the spaces so as to enhance the radiation of the heat from the batteries, and accordingly, no differences in the temperature distribution are present among the batteries in the storage battery system, thereby it is possible to prevent dispersion among the capacities of the batteries, and to enhance the cycle life characteristic of the storage battery system.

Thus, as mentioned above, since the heat generated during charging is efficiently radiated outside of the batteries, the temperature rise of the batteries can be restrained during charging without lowering the energy density thereof, thereby it is possible to provide a storage battery system which is excellent in the cycle life characteristic.

Other and further objects, features and advantages of the invention will appear more fully from the following preferred embodiments of the present inventions which will be detailed with reference to the accompanying drawings in which:

BRIEF DESCRIPTION OF THE DRAWINGS

FIGS. 1a and 1b are transverse sectional views illustrating a battery in one embodiment of the present invention;

DESCRIPTION OF THE PREFERRED EMBODIMENTS OF THE INVENTION

Embodiment 1

Figure 2:
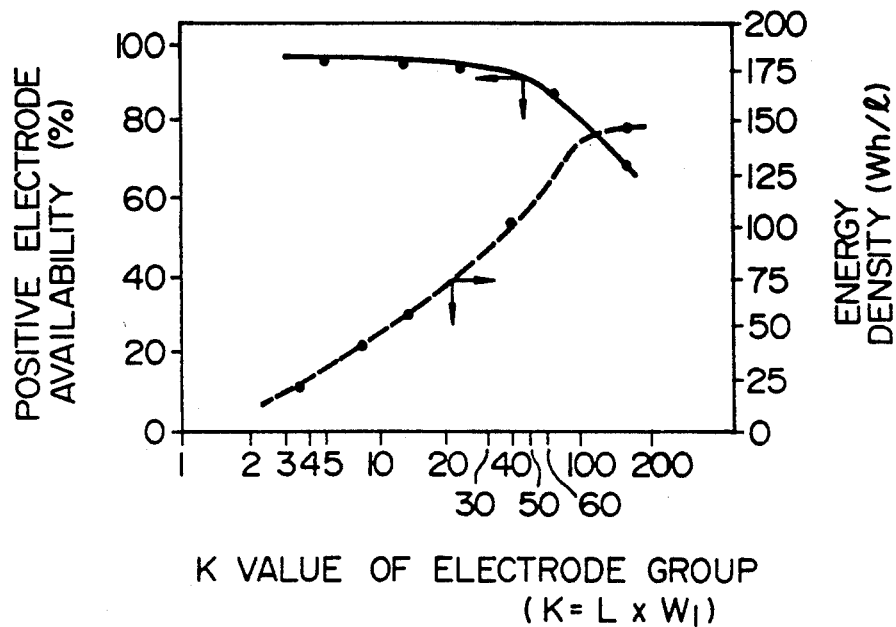
FIG. 2 is a graph showing the relationships between the value K of an electrode group and the availability of the battery, between the former and the energy density.

At first referring to FIGS. 1a to 1b, an electrode group 4 which is composed of positive electrodes 1 made of, as a main component, nickel oxide, negative electrodes 2 made of, as a main component, hydrogen storage alloy, and separators 3, is disposed in a synthetic resin battery casing in which electrolyte is charged. The battery tank 5 has an opening which is closed by a cover 7 incorporating a safety valve 6, and is provided with positive and negative electrode terminals 8, 9 so as to form a positive electrode-regulated capacity type single battery 10.

The electrode group 4 has its height H, width L and thickness $W_1$ which are changed so as to obtain a theoretical battery capacity of 25, 50, 100 and 200 Ah, respectively. Further, the value K which is obtained by multiplying the width L with the thickness $W_1$, that is, $K = L \times W_1$, is calculated. The results thereof are shown in Table 1.

As shown in Table 1, the value K can be determined with respect to the associated theoretical capacity, and the capacity increases in proportion to the thickness $W_1$ of the electrode group.

Thus, batteries were manufactured with the use of electrode groups having a specified value K, as shown in FIG. 1, and were stacked one upon another in one row so as to form a battery module. The relationship between the positive electrode availability and the energy density (energy/the bulk of the battery module) of the battery module were examined. The result is shown in FIG. 2.

As understood from the FIG. 2, as the value K of the electrode group increases, the temperature of the batteries increases since the radiation of heat cannot be efficiently made, and accordingly, the availability of active materials in the battery group is lowered, resulting in lowering of the availability of the batteries.

Further, as the value K decreases, the energy density of the batteries decreases. If the width L of the electrode group is decreased, it is required that the thickness $W_1$ thereof is increased in order to increase the energy density of the electrode group.

As the width L of the electrode group is increased, the thickness $W_1$ thereof can be decreased since the sectional area of the electrode group increases so as to increase the heat radiation area.

Specifically, in a case such that the width of the electrode group is 20 cm, when the thickness $W_1$ thereof is set to 0.5 cm, the value K is 10 cm$^2$.

However, should the value K be decreased below the above-mentioned value, the energy density of the battery would be lowered to a value below 50 Wh/l which is a practically usable minimum energy density.

Meanwhile, in a case such that the width L of the electrode group is 20 cm, when the thickness $W_1$ is set to 5 cm, the value K is 100 cm$^2$. However, should the value K be increased, exceeding this value, heat would be accumulated in the electrode group so that the availability of the positive electrodes abruptly decreases below 80% which is practically required.

Accordingly, the value K preferably falls in a range of 10 cm$^2 \leq K \leq$ 100 cm$^2$ and optimumly in a range of 20 cm$^2 \leq K \leq$ 60 cm$^2$ in order to provide a battery having a large capacity and an excellent availability.

Figure 3:
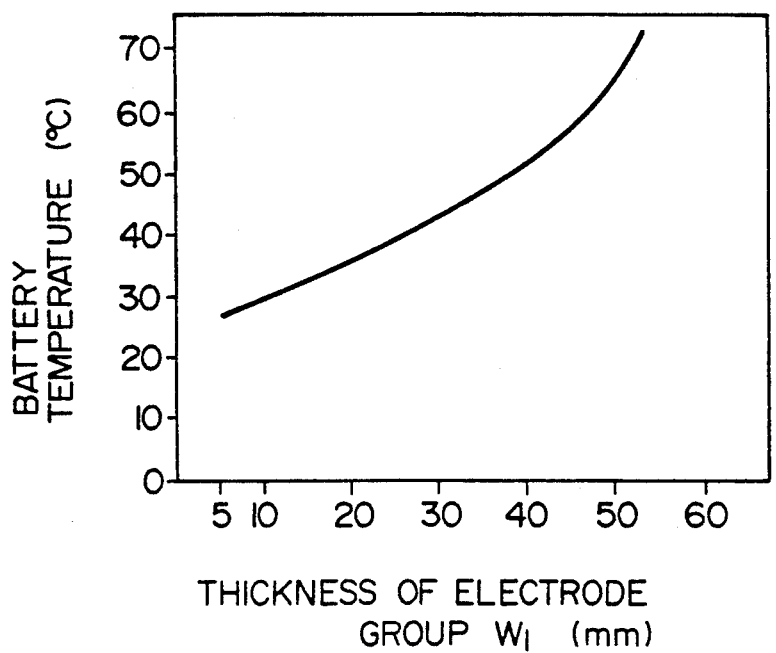
FIG. 3 is a graph showing the relationship between the thickness of the electrode group and the temperature of the battery.

FIG. 3 shows the relationship between the thickness $W_1$ of the electrode group and the temperature of the battery during charging.

Charging was made at a temperature of 25±2 deg.C up to 120% of the capacity of the battery with 0.1 C.

As shown in FIG. 3, the temperature of the battery largely varied during charging, in dependence upon the thickness of the electrode group. With a thickness larger than 50 mm, the temperature of the battery rose up to 60 deg. C, and accordingly, the cycle life of the battery lowered.

Embodiment 2

Figure 4:
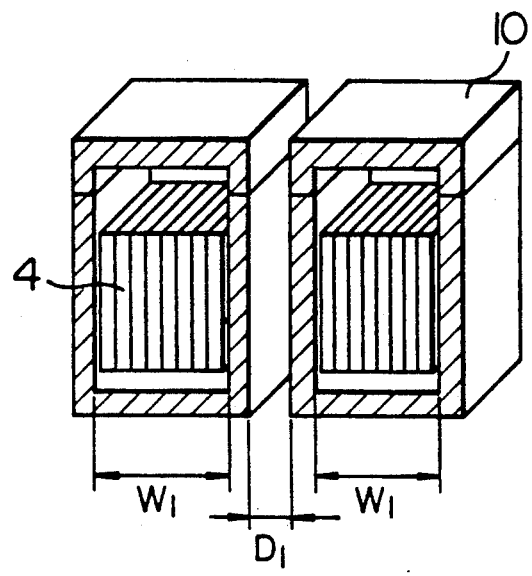
FIG. 4 is a sectional view illustrating a battery module in one embodiment of the present invention.

A plurality of batteries 10 similar to that used in the embodiment 1, were arranged with spaces having a width $D_1$ therebetween as shown in FIG. 4 so as to constitute a battery module. Further, the thickness $W_1$ of the electrode group 4 in each battery 10 and the width $D_1$ of the spaces between the batteries were changed so as to examine the relationships between the ratio $D_1/W_1$ and the battery availability and between the ratio and the energy density of the battery.

Figure 5:
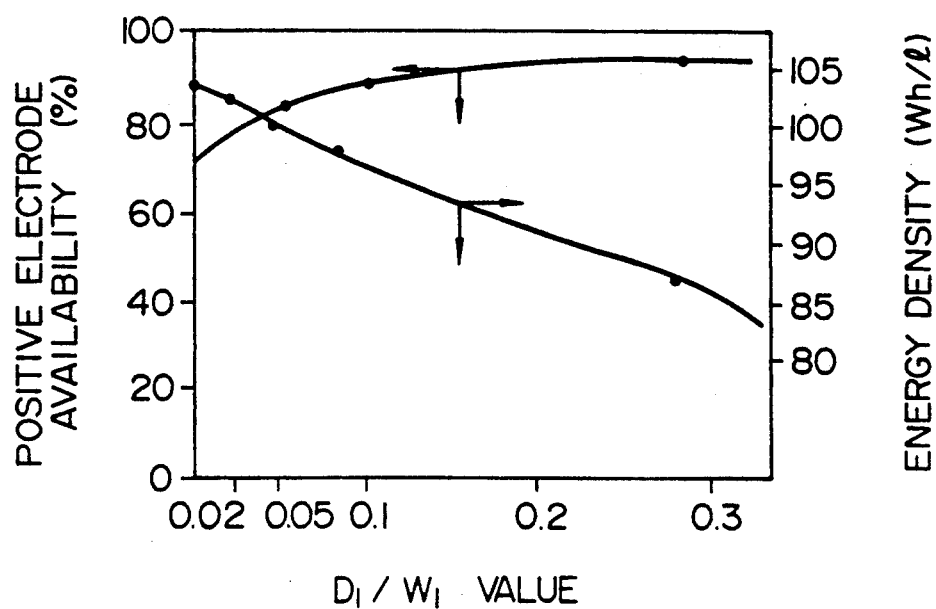
FIG. 5 is a graph showing the relationships between the ratio $D_1/W_1$ of the width $D_1$ of spaces in a module and the thickness $W_1$ of the electrode group, and the availability of positive electrodes, and between the ratio $D_1/W_1$ and the energy density.

The result is shown in FIG. 5.

As shown in FIG. 5, in such a case that, for example, the thickness $W_1$ of the electrode group is 25 mm, if the width $D_1$ of the space is set to be less than 0.5 mm so that the ratio $D_1/W_1$ is below the 0.02, the heat generated in the battery is accumulated, and higher than 50 deg.C of temperature rise occurs upon overcharging, resulting in lowering of the positive electrode availability down to a value below 80%.

Further, differences in temperature are large among the positions of batteries constituting the battery module, and accordingly, dispersion in the positive electrode availability is also large.

Further, in a case such that the thickness $W_1$ of the electrode group is 25 mm, if the width $D_1$ of the above-mentioned spaces is set to be larger than 7.5 mm so that the ratio $D_1/W_1$ is larger than 0.3, the heat generated during charging is efficiently radiated outside of the battery. Further, the temperature rise-up upon overcharging is about 40 deg.C, and accordingly, the positive availability increases up to 93 to 95%.

However, should the width $D_1$ of the spaces be increased to a value greater than this value, the bulk of the battery module would be increased. Accordingly, the energy density of the battery module is lowered down to a value which is possibly less than the practically allowable minimum energy density, that is, 85 Wh/l.

From this fact, the range of the ratio $D_1/W_1$ of the battery module in which the batteries are arranged in one row is preferably $0.02 \leq D_1/W_1 \leq 0.3$.

Embodiment 3

Figure 6A:
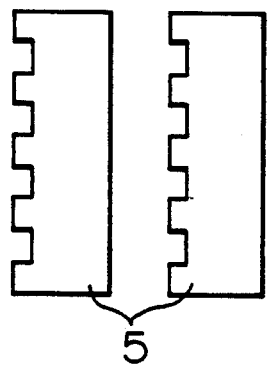
FIG. 6a is a schematic view illustrating the shape of the battery casings of the batteries in one example of the present invention, and a condition such that the batteries are stacked one upon another.
Figure 6A:
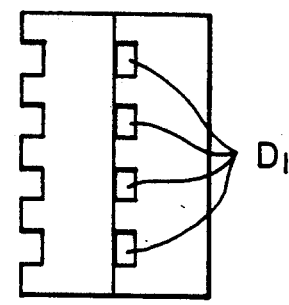
Figure 6B:
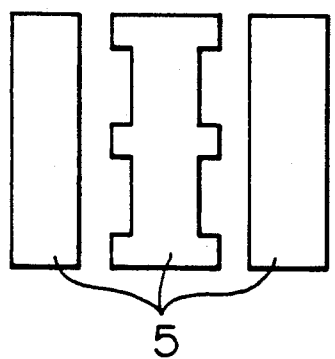
FIG. 6b is a view similar to FIG. 6a, illustrating another example of the present invention.
Figure 6B:
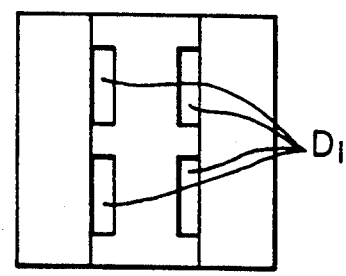
Figure 6C:
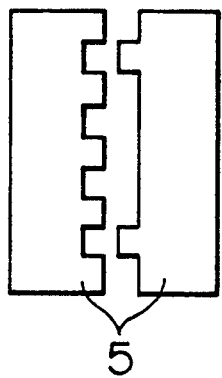
FIG. 6c is a view similar to FIG. 6a, illustrating another example.
Figure 6C:
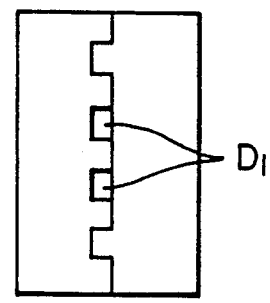

Referring to FIGS. 6a to 6c which show another example of the shape of the synthetic resin battery casing of the battery used in the embodiment 2, and the structure of a battery module, one or both of the left and right side surfaces of the battery casing 5 facing in a direction in which the batteries are stacked, are each provided with concave and convex parts, as shown on the side (A) of these figures.

Further, as shown on the side (B) of these figures, the side surface of the battery casing 5 on which convex parts are formed, are made into contact with the planar side surface of the adjacent battery casing 5, or the battery casings are arranged in parallel while the convex and concave parts of the two adjacent battery casings are combined together so as to define spaces $D_1$ between the batteries.

The heat generated upon overcharging can be efficiently radiated by air flowing through the spaces $D_1$ defined between the batteries, and accordingly, the temperature rise of the batteries can be restrained.

It is noted that a thermoconductive material such as carbon powder, carbon fibers or carbon whisker added in the synthetic resin of which the battery case is made, can enhance the thermoconductivity of the battery so as to promote the effect of heat radiation from the outer surface of the battery casing, and also can enhance the strength of the battery casing.

Embodiment 4

Figure 7A:
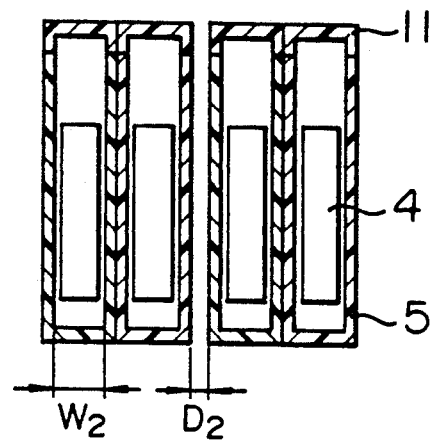
FIG. 7a is a sectional view illustrating a battery module, as one example of the present invention, in which pairs of batteries are stacked one upon another.

A pair of batteries which are similar to that used in the embodiment 1 are joined together with no space therebetween and are arranged in parallel so as to constitute a battery set 11, as shown in FIG. 7a. Further, two electrode groups which are similar to that used in the embodiment 1 are disposed in a two cell type battery casing in which two electrode groups can be housed so as to constitute a battery set 11 as shown in 7b.

Further, a plurality of battery sets 11 are arranged in parallel with spaces therebetween so as to constitute a battery module.

Figure 7B:
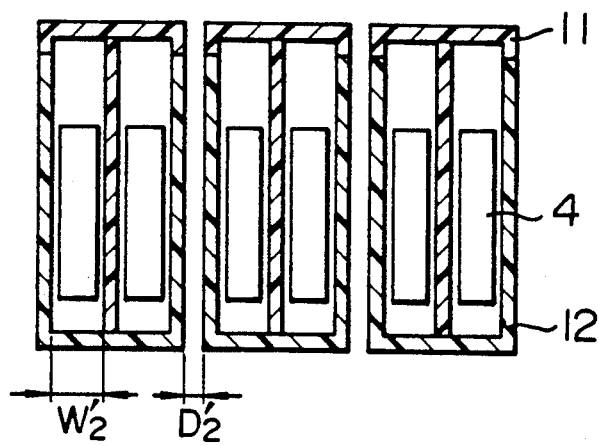
FIG. 7b is a sectional view illustrating a battery module, as another example of the present invention.

In the battery sets 11 shown in FIG. 7a, the battery group 4 has a thickness $W_2$, and the space defined between the adjacent battery sets has a width $D_2$. Further, in the battery sets 11 shown in FIG. 7b, the electrode group has a thickness $W_2'$ and the spaces defined between the adjacent those of the battery sets 11 have a width $D_2'$.

The widths $W_2$, $W_2'$ of the electrode groups and the widths $D_2$, $D_2'$ of the spaces between the battery sets 11 were changed so as to examine the relationships between the ratios $D_2/W_2$, $D_2'/W_2'$ and the positive electrode availability, and between the ratios and the energy density of the battery module.

Figure 8:
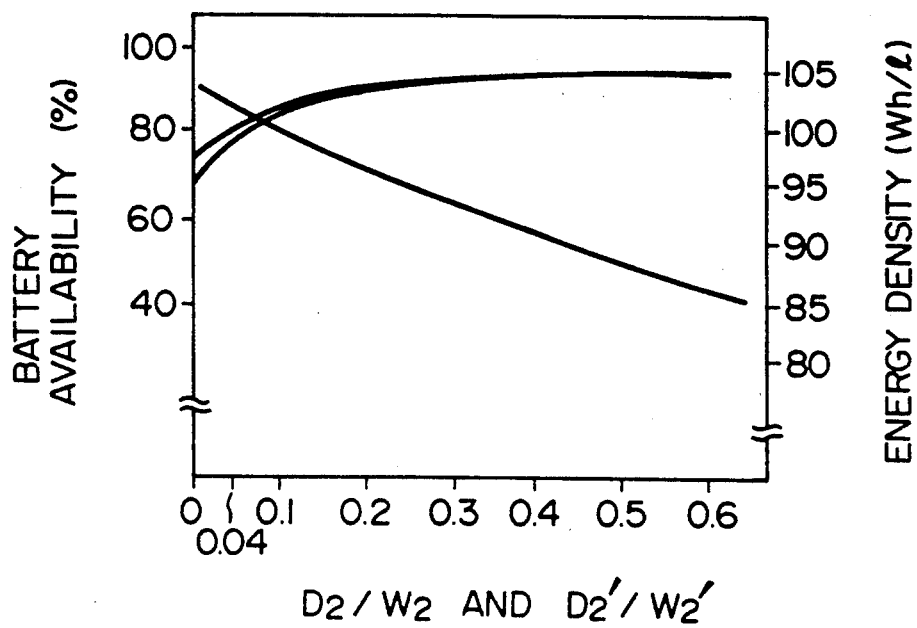
FIG. 8 is a graph showing the relationships between ratios $D_2/W_2$ and $D_2'/W_2'$ of the battery module and the positive electrode availability, and between the ratios and the energy density.

The results are shown in FIG. 8.

As understood from FIG. 8, for example, in a case such that the thickness $W_2$, $W_2'$ of the electrode groups are 25 mm, when the widths $D_2$, $D_2'$ of the spaces are set to be less than 1 mm so that the ratios $D_2/W_2$, $D_2'/W_2'$ are less than 0.04, the heat generated during charging is accumulated in the battery groups so that the temperature of the batteries rises, resulting in lowering of the positive electrode availability down to 80%.

Further, in a case such that the thickness $W_2$, $W_2'$ of the electrode groups is 25 mm, when the widths $D_2$, $D_2'$ of the spaces are set to be greater than 15 mm so that the ratios $D_2/W_2$, $D_2'/W_2'$ are larger than 0.6, the heat radiation can be efficiently made, and accordingly, the battery availability can be enhanced up to 90 to 93%. However, should the widths $D_2$, $D_2'$ of the spaces be increased exceeding these ratios, the bulk of the battery module becomes large, causing the energy density to lower down to a value below 85 Wh/l which is the practically allowable lower limit.

Accordingly, The ratios $D_2/W_2$, $D_2'/W_2'$ preferably fall in a range of $0.04 \leq D_2/W_2 \leq 0.6$ or a range $0.04 \leq D_2'/W_2' \leq 0.6$.

Figure 9:
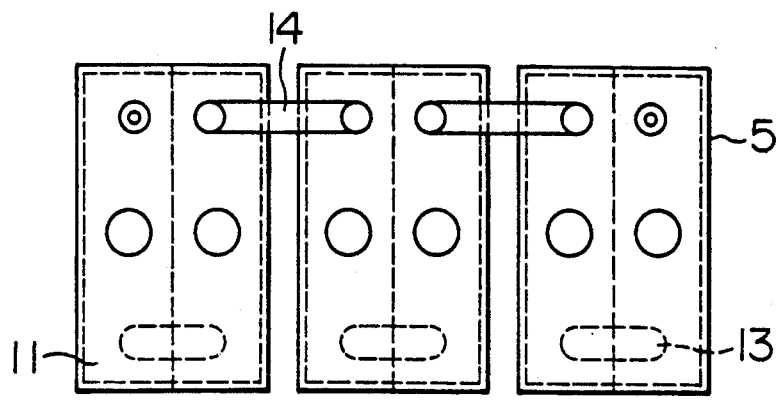
FIG. 9 is a view illustrating pairs of batteries in a stacked condition.

It is noted that the electrode groups 4 in the above-mentioned battery set 11 are connected together by means of internal terminal connectors 13 within the battery casing 5, but the battery sets are connected together by means of external terminal connectors 14 outside of the battery casings, as shown in FIG. 9.

Figure 10:
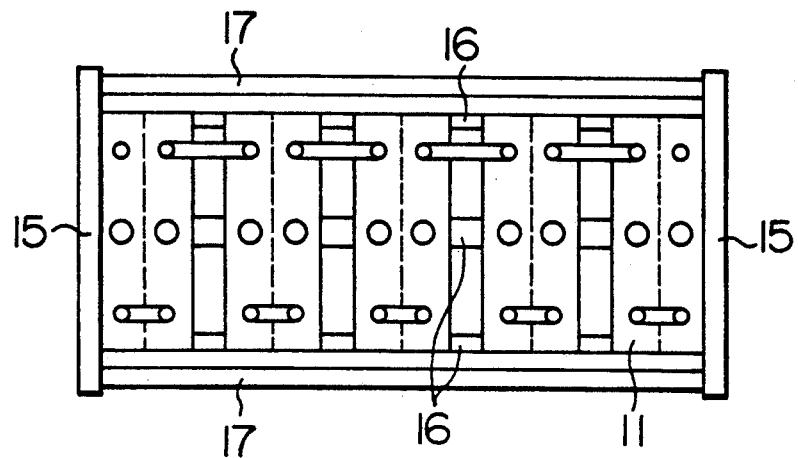
FIG. 10 is a view illustrating a battery module incorporating fixtures at opposites ends thereof.

Further, the battery module in which a plurality of the battery sets 11 as shown in FIG. 9 are arranged, is fixed at its left and right end surfaces in order to prevent the battery casings from swelling during the use of the batteries. That is, as shown in FIG. 10, fixtures 15 having an excellent heat radiation ability are arranged at the left and right end surfaces of the battery module in which the battery sets 11 are arranged in parallel, and reinforcements 16 are partly disposed in the spaces between the battery sets 11. The battery sets 11 are all then fastened by longitudinal fasteners 17 in its entirety so as to be fixed and united.

It is noted here that the reinforcements may be ribs or the like integrally incorporated with the battery casings 5. Further, the reinforcements and the fasteners 17 may be used for fastening a battery module in which a plurality of batteries are arranged, and accordingly, it is possible to prevent the batteries in this battery module from swelling during charging so as to enhance the cycle life of the batteries.

Further, with the use of battery casings in which carbon whisker is added, the heat radiation and the strength of the battery casing can be enhanced, and the cycle life can be prolonged by about 30 to 35%.

Embodiment 5

Electrolyte used in the above-mentioned embodiments 1 to 4, is mainly composed of potassium hydroxide solution. Even with this electrolyte, the temperature rise of the battery during charging differs depending upon the quantity thereof. Accordingly, in the case of a batteries having an intermediate capacity, that is, 20 to 300 Ah, the quantity of the electrolyte greatly affects the battery capacity.

Accordingly, in a single battery alone in a battery set in which two battery are incorporated, or in a battery module in which a plurality of the battery sets are arranged and stacked in parallel, the electrolyte is charged by a quantity which falls in a range of 1.5 to 3.5 ml/Ah with respect to the theoretical discharge volume of positive electrode.

Figure 11:
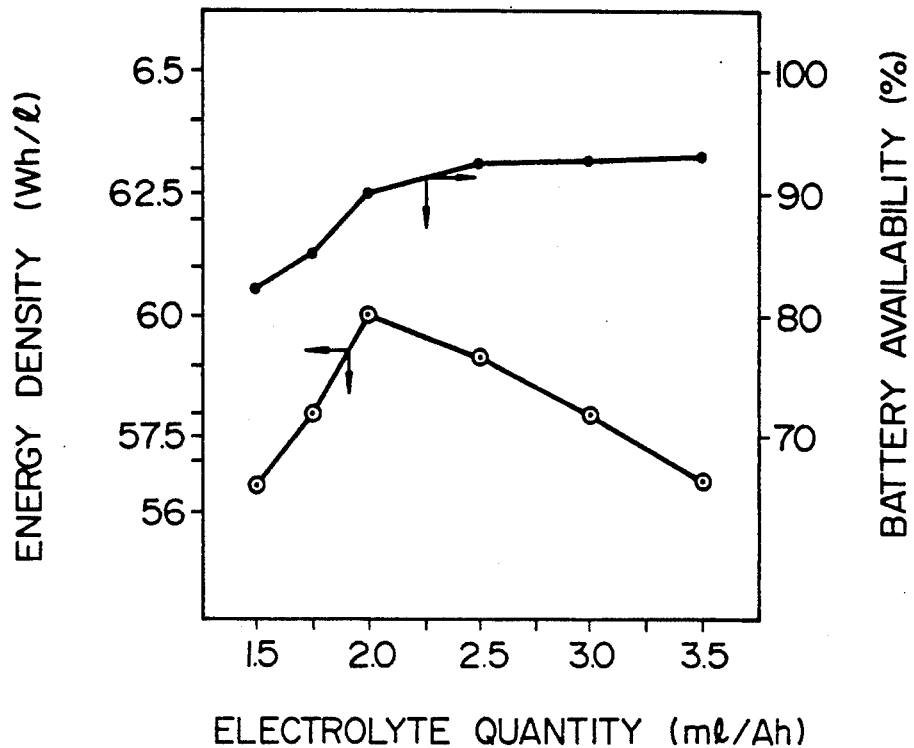
FIG. 11 is a graph showing the relationship between the quantity of electrolyte and the energy density and between the former and the battery availability.

The relationships between the quantity (ml/Ah) of the electrolyte and the energy density and between the same and the battery availability are shown in FIG. 11.

If the quantity of the electrolyte is less than 1.75 ml/Ah with respect to the discharge capacity, the temperature rise is high upon overcharging, and accordingly, the battery availability lowers down to a value less than 85%. Accordingly, the energy density per unit weight becomes lower than 57 Wh/kg. Although the energy density is greater than a value of 55 Wh/kg which is practically necessary, the rate of the temperature rise of the batteries is high so that cycle life is lowered.

Meanwhile, if the quantity of the electrolyte is larger than 3.0 ml/Ah, the temperature rise upon overcharging is less, and accordingly, the battery availability increases up to 93%. However, since the weight of the battery is increased due to an increase in the filling quantity of the electrolyte, the energy density per unit weight is lowered down to 57 Wh/kg. Further, the quantity of the electrolyte is larger as necessary, oxygen gas generated at the positive electrodes upon overcharging can hardly be absorbed by the negative electrodes, and accordingly, the internal pressure of the battery increases. If the internal pressure of the battery largely increases, the electrolyte or cracked gas is discharged through the safety valve, resulting in decrease in the quantity of the electrolyte, and accordingly, the cycle time is lowered.

In view of the above-mentioned results, the satisfactory range of the quantity of the electrolyte is 1.75 to 3.0 ml/Ah, and the more satisfactory range thereof is 2.0 to 2.75 ml/Ah. In these ranges, the storage battery system having an intermediate capacity of 20 to 300 Ah can have a large energy density and a long cycle life.

Embodiment 6

Figure 12:
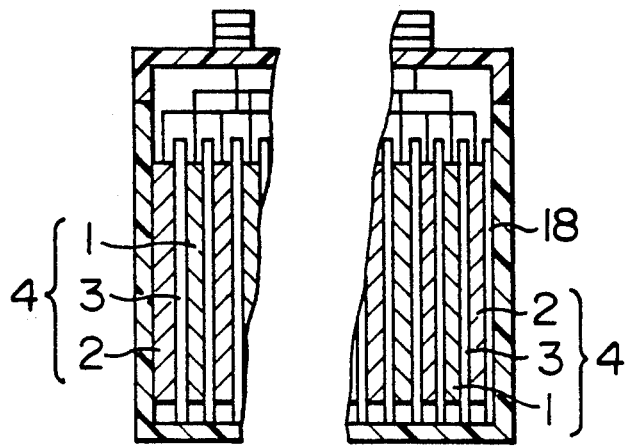
FIG. 12 is a view illustrating the structure of the electrode group in the battery casing.

In a single battery, in a battery set in which more than two batteries are combined, or in a battery module in which a plurality of battery sets are arranged and stacked in parallel, negative electrode plates 2 are arranged at the outermost opposite side surfaces of the electrode group 4, and the electrode group 4 is disposed in the battery casing 5 so that the negative electrode plates 2 are made into close contact with the inside wall surfaces of the battery casing 5, as shown in FIG. 12.

Further, a liquid retaining member 18 (buffer member) is arranged on one or each of the outermost side surfaces of the electrode group and is made into contact with the inside wall surface of the battery casing 5.

Then, the negative electrode plates 2 are arranged at the outermost end surfaces of the electrode group, and are then made into close contact with the inside surfaces of side walls of the battery casing. As a result, the heat is efficiently radiated outside of the battery through the outer surfaces of the electrode plates 2 since the thermal conductivity of the negative electrode plate is higher than that of the positive electrode plates 1. Further, since the outer surfaces of the negative electrode plates are made into close contact with the inside wall surface of the battery casing, the heat radiation is further enhanced so that the temperature rise is restrained by about 2 to 3 deg.C. Thus the cycle life of this battery becomes longer than that of a battery in which the positive electrode plates are arranged at the outermost side surfaces of the electrode, by 1.5 to 1.8 times.

Further, the provision of the liquid retaining member 18 disposed between the negative electrode plate 2 and the inside wall surface of the battery casing 5 can enhance the cycle life of the battery by 1.7 to 2.5 times in comparison with that of a conventional battery in which separators are alone used. This liquid retaining member 18 is made of hydrophilic porous materials having micropores of about 0.2 to 1.9 mm, and has a relatively large compressive strength. Since it is porous and hydrophilic, its liquid retentivity is high, and accordingly, a relatively large quantity of the electrolyte can be retained therein. The heat generated from the electrode group 4 can be smoothly transmitted through the electrolyte held in the liquid retaining member 18, and accordingly, the heat radiation outside of the battery can be made at a relatively high rate. Further, since extra electrolyte obtained during first filling of the electrolyte can be held by the liquid retaining member 18 so as to eliminate the so-called free liquid, the handling of the battery becomes satisfactory. Further, when the quantity of the electrolyte becomes insufficient during use of the battery, the electrolyte held in the liquid retaining member 18 is shifted into the electrode group 4 which is therefore replenished therewith so as to ensure the quantity of the electrolyte which is required for electrode reaction. Accordingly, it is possible to enhance the cycle life. Further, this liquid retaining member 18 also serves as a buffer member which is pressed and compressed if the electrodes expand during charging, and accordingly, the electrolyte held in the liquid retaining member 18 is forcibly shifted to the electrodes and the separators, thereby it is possible to maintain the balance of the electrolyte in the battery.

Further, the electrolyte is fed from the liquid retaining member 18 in accordance with a degree of expansion of the electrodes during charging and discharging, the prolonging of the life of the battery and the maintenance-free effect can be particularly exhibited, thereby it is possible to improve the maintenance and the handling of the battery.

By attaching such a liquid retaining member 18 to a part of the electrode group 4, the heat radiation and the replenishment of the electrode group with the electrolyte within the battery can be made, and accordingly, the cycle life of the battery module can be prolonged by three times in comparison with that of a battery in which no such liquid retaining member 18 is used. The liquid retaining member 18 is preferably made of synthetic resin, ceramic, metal fibers or alkali resistant materials. Further, if the liquid retaining member 18 is hydrophilic, and has a porous part, that is, if it has a high liquid retentivity and a relatively high strength, it can exhibit similar effects.

Embodiment 7

Figure 13:
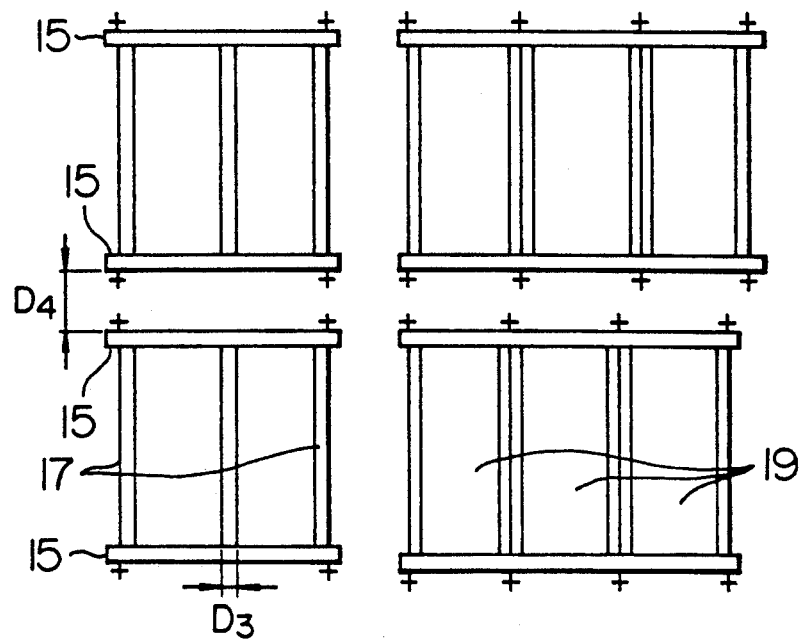
FIG. 13 is a view illustrating a battery group in which a plurality of the battery modules are stacked one upon another.

As shown in FIG. 13, a plurality of battery modules 19 each having the batteries or battery sets each composed of two batteries, which are arranged in one row in parallel, are arranged in two rows in parallel with a space therebetween so as to constitute a grouped storage battery system.

In this grouped storage battery system, fixtures 15 are arranged at the top and bottom side surfaces of the plurality of battery modules 19, and the battery modules 19 are all fastened by fasteners 17.

In this arrangement, the space between the side surfaces of the battery modules arranged in parallel on which side surfaces no fixtures are present, has a width $D_3$, and the space between the adjacent fixtures in the storage battery system has a width $D_4$.

Further, the width $W_3$ of the electrode group and the width $D_3$ of the above-mentioned space were changed so as to examine the relationship between the ratio $D_3/W_3$ and the battery characteristic. In a case such that the thickness $W_3$ of the electrode groups is 20 mm, when the width $D_3$ of the space is set to be less than 1.0 mm so that the ratio $D_3/W_3$ is less than 0.05, the heat generated during charging is accumulated in the batteries so that the temperature of the batteries rises, resulting in decreasing of the cycle life of the battery group.

Further, in a case such that the thickness $W_3$ of the electrode groups is 20 mm, the width $D_3$ of the space is set to be greater than 40 mm so that the ratio $D_3/W_3$ is larger than 2. In this range, the effect of the heat radiation is not increased even though the width $D_3$ of the space is increased. Contrary, the energy density of the storage battery system is lowered by increasing $D_3$.

Accordingly, the ratio $D_3/W_3$ preferably falls in a range of $0.05 \leq D_3/W_3 \leq 2$.

Further, the width $D_4$ of the space between the adjacent fixtures is preferably about 0.2 to 3.0 cm. With this arrangement it is possible to enhance the space efficiency of the storage battery system and the efficiency of the heat radiation.

Embodiment 8

Figure 14:
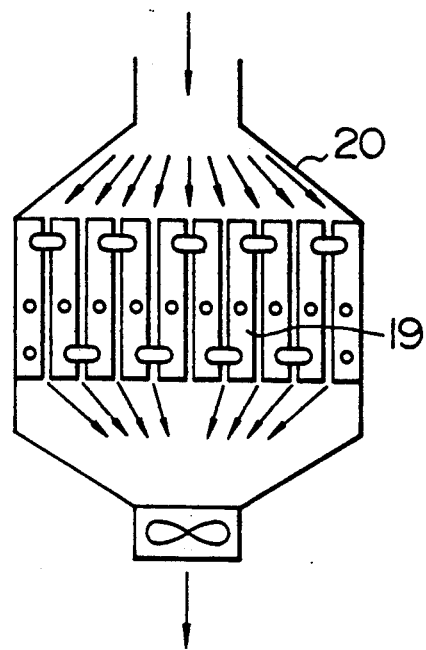
FIG. 14 is a view illustrating a battery module incorporating an air supply device in one example of the present invention.
Figure 15:
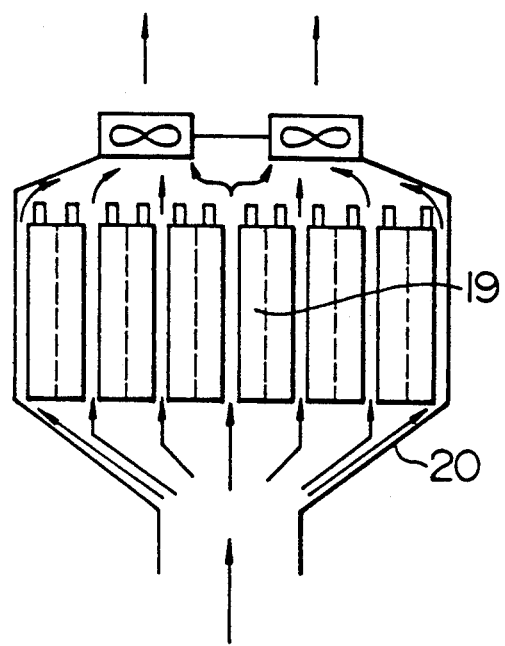
FIG. 15 is a view illustrating a battery module incorporating air supply device in another example of the present invention.

A storage battery system incorporating an air supply device for forced air-cooling, according to the present invention, is shown in FIGS. 14 and 15.

Referring to FIGS. 14 and 15, in a battery module 19 in which batteries or battery sets each composed of batteries are arranged in parallel with the spaces therebetween, air is forcibly fed into the spaces from one side thereof by means of the air supply device 20 such as a blower or a fan, and is sucked up from the other side, depending upon the situation.

Further, in order to further enhance the efficiency of the heat radiation, cooling air having passed through a heat-exchanger for a cooler is preferably fed into the spaces between the batteries, vertically upward.

In this arrangement, the air volume of the air supply device is adjusted in accordance with a size of the battery or the storage battery system.

As to the cooling, in a case such that air or cooling air is merely fed into the spaces between the batteries as in a conventional storage battery system, the flow of the air is not uniform, and accordingly, the temperature of all batteries cannot be uniformly lowered, and accordingly, the cycle life of the storage battery system is lowered.

On the contrary, the air supply device according to the present invention, air is fed to the bottom surfaces and the side surfaces of the batteries, and is sucked up as desired from the opposite side thereof, and accordingly, air uniformly flows through the spaces between the batteries. Thus, the temperature distribution of all batteries can be substantially uniform, thereby it is possible to greatly enhance the cycle life.

Further, estimation is made such that the cycle life of a storage battery system with no forced cooling is 100, the heat radiation in which air is forcibly fed can have a cycle life of 130 (1.3 times), the heat radiation in which air is forcibly fed and is sucked up can have 200 (twice) and the heat radiation in which air is cooled by a heat-exchanger such as a cooler and is then fed and sucked up, can have a value larger than 250 (2.5 times). It is noted here that the cycle life of the storage battery system is lowered if one of batteries or one of battery modules therein deteriorates.

Accordingly, with the uniform heat radiation, the cycle life of the storage battery system can be greatly enhanced in its entirety.

Although it has been explained in this embodiment that the air flows from the bottom surfaces to the top surfaces of the batteries, a similar effect can be also obtained by the air which is forcibly fed from the top surfaces to the bottom surfaces of the batteries. Further, although it has been explained that only one battery module is used in this embodiment, a similar effect can be obtained with the use of more than one battery module.

As mentioned above, the storage battery system according to the present invention, has batteries each of which is incorporated therein with an electrode group having negative electrodes made of hydrogen storage alloy, and which are arranged with spaces therebetween so as to constitute at least one of battery modules. In this storage battery system, the value K obtained by multiplying the width L of the electrode group with the thickness $W_1$ thereof, that is, $K = L \times W_1$ falls in a range of $10 \text{ cm}^2 \leq K \leq 100 \text{ cm}^2$, and the ratio $D_1/W_1$ between the width $D_1$ of the spaces between the batteries and the thickness $W_1$ of the electrode group falls in a range of $0.02 \leq D_1/W_1 \leq 0.3$, and accordingly, the heat generated during charging can be efficiently radiated outside of the batteries without being accumulated in the insides of the batteries, thereby it is possible to provide a storage battery system which has an excellent cycle life.

TABLE 1

| No | H cm | L cm | $W_1$ cm | | | | $K(L \times W_1)$ cm² | | | |
|---|---|---|---|---|---|---|---|---|---|---|
| | | | 25Ah | 50Ah | 100Ah | 200Ah | 25Ah | 50Ah | 100Ah | 200Ah |
| 1 | 15 | 5 | 2.08 | 4.15 | 8.3 | 16.6 | 10.4 | 20.8 | 41.5 | 83 |
| 2 | 15 | 10 | 1.04 | 2.08 | 4.15 | 8.3 | 10.4 | 20.8 | 41.5 | 83 |
| 3 | 15 | 15 | 0.62 | 1.25 | 2.5 | 5.0 | 9.3 | 18.8 | 37.5 | 75 |
| 4 | 15 | 20 | 0.53 | 1.05 | 2.1 | 4.2 | 10.6 | 21 | 42 | 84 |
| 5 | 15 | 25 | 0.4 | 0.8 | 1.6 | 3.2 | 10 | 20 | 40 | 80 |
| 6 | 10 | 20 | 0.8 | 1.6 | 3.2 | 6.4 | 16 | 32 | 64 | 128 |
| 7 | 10 | 15 | 1.05 | 2.1 | 4.2 | 8.4 | 15.8 | 31.5 | 63 | 126 |
| 8 | 5 | 10 | 3 | 6 | 12 | 24 | 30 | 60 | 120 | 240 |
| 9 | 5 | 15 | 2 | 4 | 8 | 16 | 30 | 60 | 120 | 240 |
| 10 | 5 | 20 | 1.5 | 3 | 6 | 12 | 30 | 60 | 120 | 240 |
| 11 | 5 | 5 | 6.3 | 12.5 | 25 | 50 | 31.5 | 62.5 | 125 | 250 |
| 12 | 10 | 5 | 3.1 | 6.2 | 12.4 | 24.8 | 15.5 | 31 | 62 | 124 |
| 13 | 20 | 5 | 1.6 | 3.15 | 6.3 | 12.6 | 8 | 15.8 | 31.5 | 63 |
| 14 | 25 | 5 | 1.3 | 2.5 | 5.0 | 10.1 | 6.5 | 12.5 | 25 | 50.5 |
| 15 | 30 | 2.5 | 2.08 | 4.15 | 8.3 | 16.6 | 5.2 | 10.4 | 20.8 | 41.6 |

What is claimed is:

1. A storage battery system comprising at least one of battery modules each comprising a plurality of batteries, each of said plurality of batteries having a battery casing and including an electrode group which is composed of positive electrodes using metal oxide as an active material, negative electrodes made of, as a main component, hydrogen storage alloy which electrochemically absorbs and desorbs hydrogen, and separators, and which is disposed in said battery casing;

said plurality of batteries being arranged in rows with spaces being defined between adjacent those of said plurality of batteries;

said electrode group having a dimensional relationship such as $H > L > W$, where H is the height of the electrode group, L is the width of the electrode group, and W is the thickness of the electrode group;

a value K which is obtained by multiplying the width L with the thickness W, that is, $K = W \times L$ falling in a range such as $10 \leq K \leq 100$; and, a ratio D/W between a width D of spaces between the adjacent those of said plurality of batteries and the thickness W of the electrode group falling in a range such as $0.02 \leq D/W \leq 0.3$.

2. A storage battery system as set forth in claim 1, wherein said electrode group disposed in each of said battery casings having an inside surface, includes negative electrode plates arranged at opposite ends thereof, said negative electrode plates at opposite ends thereof are made into direct contact with the inside surface of said battery casing or are held against the inside surface thereof through the intermediary of separators or electrolyte retaining members.

3. A storage battery system as set forth in claim 1, wherein each of said battery casings in which said electrode group is disposed is made of synthetic resin, and has opposite outside surfaces in a direction in which said electrode group is arranged, on one or both of which a plurality of concave and convex parts are formed longitudinally of said battery casing.

4. A storage battery system as set forth in claim 3, wherein said plurality of concave and convex parts which are formed on one or both of the opposite outside surfaces of each of said battery casings made of synthetic resin are engaged with those formed on the one or both of adjacent one of said plurality of battery casings with convex parts being fitted in concave parts vise versa at least one position.

5. A storage battery system comprising at least one of battery modules each comprising a plurality of pairs of batteries defining therebetween spaces, each of said pair of batteries having a battery casing and including an electrode group which is composed of positive electrodes using metal oxide as an active material, negative electrodes made of, as a main component, hydrogen storage alloy which electrochemically absorbs and desorbs hydrogen, and separators, and which is disposed in said battery casing;

said plurality of pairs of batteries being arranged in rows with spaces being defined therebetween;

said electrode group disposed in each of said battery casings and each of said spaces between said batteries having a relationship such as $0.04 \leq D_2/W_2 \leq 0.6$ where $W_2$ is the thickness of the electrode group disposed in each of the battery casings, and $D_2$ is the thickness of the space.

6. A storage battery system as set forth in claim 5, wherein said electrode group disposed in each of said battery casings having an inside surface, includes negative electrode plates arranged at opposite ends thereof, said negative electrode plates at opposite ends thereof are made into direct contact with the inside surface of said battery casing or are held against the inside surface thereof through the intermediary of separators or electrolyte retaining members.

7. A storage battery system as set forth in claim 5, wherein batteries in each pair are electrically connected within said battery casings, and said pairs of batteries in each battery module are electrically connected outside of the battery casings.

8. A storage battery system as set forth in claim 1, wherein each of said battery modules has fixtures arranged at opposite ends thereof, space reinforcements are disposed between said batteries or between said pairs of batteries, and all batteries in each of said battery modules are clamped between said fixtures.

9. A storage battery system as set forth in claim 1, wherein batteries in each of said battery modules are arranged in parallel so as to constitute a battery group while define therebetween spaces, and the batteries in said battery group is clamped between fixtures arranged at opposite ends of said battery group so as to be united with one other;

each of said battery modules and the electrode group disposed in each of batteries in said battery module have a relationship such as $0.05 \leq D_3/W_3 \leq 2$, where $D_3$ is the width a space between side surfaces of said battery module at which no fixtures are present, and $W_3$ is the thickness of the electrode group; and the width $D_4$ of a space between adjacent those of said fixtures is set to 0.2 to 3 cm.

10. A storage battery system as set forth in claim 1, wherein the volume of electrolyte filled in each of said batteries, is 1.75 to 3.0 ml/Ah with respect to the theoretical discharge capacity of the positive electrodes stored in each of said battery casings.

11. A storage battery system as set forth in claim 1, wherein there is provided an air supply device for forcibly blowing air into the spaces between the batteries or between the pairs of batteries.

12. A storage battery system as set forth in claim 1, wherein said battery modules are arranged in parallel, defining spaces therebetween, and there is provided an air supply device for forcibly blowing air into said spaces.

13. A storage battery system as set forth in claim 11, wherein said air supply device is arranged so that air flowing through said spaces between said battery modules flows from bottom to top surfaces or vice versa of the module batteries.

14. A storage battery system as set forth in claim 12, wherein said air supply device is arranged so that air flowing through said spaces between said battery modules flows from bottom to top surfaces or vice versa of the module batteries.

15. A storage battery system as set forth in claim 5, wherein each of said battery modules has fixtures arranged at opposite ends thereof, space reinforcements are disposed between said batteries or between said pairs of batteries, and all batteries in each of said battery modules are clamped between said fixtures.

16. A storage battery system as set forth in claim 5, wherein batteries in each of said battery modules are arranged in parallel so as to constitute a battery group while defining therebetween spaces, and the batteries in said battery group are clamped between fixtures arranged at opposite ends of said battery group so as to be united with one other;

each of said battery modules and the electrode group disposed in each of batteries in said battery module have a relationship such as $0.05 \leq D_3/W_3 \leq 2$, where $D_3$ is the thickness of the electrode group; and the width $D_4$ of a space between adjacent those of said fixtures is set to 0.2 to 3 cm.

17. A storage battery system as set forth in claim 5, wherein the volume of electrolyte filled in each of said batteries, is 1.75 to 3.0 ml/Ah with respect to the theoretical discharge capacity of the positive electrodes stored in each of said battery casings.

18. A storage battery system as set forth in claim 5, wherein there is provided an air supply device for forcibly blowing air into the spaces between the batteries or between the pairs of batteries.

19. A storage battery system as set forth in claim 5, wherein said battery modules are arranged in parallel, defining space therebetween, and there is provided an air supply device for forcibly blowing air into said spaces.

20. A storage battery system as set forth in claim 18, wherein said air supply device is arranged so that air flowing through said spaces between said battery modules flows from bottom to top surfaces or vice versa of the module batteries.

21. A storage battery system as set forth in claim 19, wherein said air supply device is arranged so that air flowing through said spaces between said battery modules flows from bottom to top surfaces or vice versa of the module batteries.

* * * * *